(12) United States Patent
Nakayama et al.

(10) Patent No.: US 6,690,114 B2
(45) Date of Patent: Feb. 10, 2004

(54) VEHICLE HEADLAMP

(75) Inventors: Toru Nakayama, Shizuoka (JP); Satoru Yashiki, Shizuoka (JP); Kazuhito Iwaki, Shizuoka (JP)

(73) Assignee: Koito Manufacturing Co., Ltd., Tokyo (JP)

( * ) Notice: Subject to any disclaimer, the term of this patent is extended or adjusted under 35 U.S.C. 154(b) by 0 days.

(21) Appl. No.: 10/357,888

(22) Filed: Feb. 4, 2003

(65) Prior Publication Data

US 2003/0151370 A1 Aug. 14, 2003

(30) Foreign Application Priority Data

Feb. 8, 2002 (JP) .................................. P. 2002-031808

(51) Int. Cl.[7] .............................. B60Q 1/26; B60Q 3/00
(52) U.S. Cl. ......................................... 315/77; 362/507
(58) Field of Search .............................. 315/77, 82, 80, 315/84; 362/226, 263, 265, 401, 546, 548, 507

(56) References Cited

U.S. PATENT DOCUMENTS 5,067,056 A * 11/1991 Suzuki et al. ............... 362/462
5,664,870 A * 9/1997 Uchida et al. .............. 362/459
5,700,079 A    12/1997 Woerner et al. ............... 362/80
6,203,177 B1 * 3/2001 Watanabe et al. ........... 362/351
6,550,935 B1 * 4/2003 Ueno et al. ................. 362/263

FOREIGN PATENT DOCUMENTS

| EP | 0854315 A2 | 7/1998 |
| JP | A-09-298001 | 11/1997 |
| JP | A-10-172303 | 6/1998 |
| JP | 2001-236805 | 8/2001 |

* cited by examiner

Primary Examiner—James Clinger
Assistant Examiner—Minh D A
(74) Attorney, Agent, or Firm—Fish & Richardson P.C.

(57) ABSTRACT

A vehicle headlamp includes a reflector, a discharge bulb, a lighting circuit for supplying electric power to the discharge bulb, a socket coupled to the discharge bulb to connect the discharge bulb to the lighting circuit, an opening portion formed in a portion of a lamp body disposed rearwardly of the discharge bulb, and a cover for covering the opening portion. A power source-side connector and a bulb-side connector are fixedly secured to a portion of the lamp body disposed in the vicinity of the opening portion. The lighting circuit and an output connector for connection to the bulb-side connector are integrally formed on the cover. When the cover is moved to open the opening portion, the connection between the power source-side connector and the input connector and the connection between the bulb-side connector and the output connector are simultaneously interrupted.

6 Claims, 3 Drawing Sheets

VEHICLE HEADLAMP

BACKGROUND OF THE INVENTION

1. Field of the Invention

This invention relates to a novel vehicle headlamp. More specifically, the invention relates to an assembly and technique for securing safety during an operation, such as a discharge bulb-exchanging operation, in a vehicle headlamp having a discharge bulb serving as a light source.

2. Description of the Related Art

For lighting a discharge bulb, it is necessary to apply a high voltage thereto, and therefore a lighting circuit is required to increase a battery voltage, and also to convert it into an alternating (AC) voltage, and apply it to the discharge bulb. Therefore, a vehicle headlamp, having a discharge bulb serving as a light source, is provided with such a lighting circuit.

In order to effect an operation such as a discharge bulb-exchanging operation, a socket, connecting the lighting circuit to the discharge bulb, is removed from the discharge bulb. If this operation is carried out wherein the provision of a lighting switch is omitted, or the operator has forgotten to turn off the lighting switch, a dangerous condition occurs since a high voltage is applied to a terminal portion of the socket.

Therefore, there has been proposed a vehicle headlamp of the type in which a lighting circuit is provided integrally on a cover which can close and open an opening formed in a lamp body (supporting a reflector on which a discharge bulb is mounted) for the purpose of effecting an operation such as a discharge bulb-exchanging operation. An output end of the lighting circuit is connected via a wire harness to a socket which can be releasably attached to the discharge bulb, and an input connector is provided at the lighting circuit, and a power source-side connector, provided at a wire harness extending from a power source portion, is connected to the input connector.

In the above conventional vehicle headlamp, for example, when exchanging the discharge bulb with a new one, the cover is removed from the opening, and also the power source-side connector is disconnected from the input connector. By doing so, the supply of electric power from the power source to the lighting circuit is interrupted, so that the high voltage is not supplied to the terminal portion of the socket, and therefore this is safe. Even if the operator should touch a terminal portion of the power source-side connector, this is not so dangerous since only a battery voltage is applied to this terminal portion.

In the above conventional vehicle headlamp, the power source-side connector is provided at the free end of the wire harness, and therefore the operation, such as the discharge bulb-exchanging operation, can be carried out by moving the cover from the opening without the need for removing the power source-side connector from the input connector.

In the case where there is provided a lighting switch, it is quite possible that a lazy operator, who tends to effect the discharge bulb-exchanging operation without turning off the lighting switch, carries out the discharge bulb-exchanging operation without canceling the connection between the power source-side connector and the input connector.

SUMMARY OF THE INVENTION

The invention provides a construction in which an operation, such as a discharge bulb-exchanging operation, can not be carried out unless the supply of electric power to a lighting circuit is completely interrupted, thereby positively ensuring safety during the operation such as the discharge bulb-exchanging operation.

The above problems have been solved by a vehicle headlamp of the invention. A power source-side connector, which is provided on an input line for inputting electric power from a power source into a lighting circuit, and a bulb-side connector, which is connected to one end of an output line which is connected at the other end thereof to a socket so as to output the electric power from the lighting circuit to a discharge bulb, are fixedly secured to that portion of a lamp body disposed in the vicinity of an opening portion. The lighting circuit, which is provided with an input connector for connection to the power sourceside connector, and an output connector for connection to the bulb-side connector, is integrally formed on a cover. When the cover is-moved to open the opening portion, the connection between the power source-side connector and the input connector and the connection between the bulb-side connector and the output connector are simultaneously interrupted.

Therefore, in the vehicle headlamp of the present invention, when the opening portion in the lamp body is opened so as to enable an operation, such as a discharge bulb-exchanging operation, to be effected, the connection between the power source-side connector and the input connector and the connection between the bulb-side connector and the output connector are simultaneously interrupted without fail. Consequently, the electric power will not be supplied to the lighting circuit. Therefore, when the operation, such as the discharge bulb-exchanging operation, is carried out even in a condition in which the operator has forgotten to turn off a lighting switch, the operator will not touch any high voltage-applied portion such as the socket.

DETAILED DESCRIPTION

An embodiment of a vehicle headlamp of the present invention will now be described with reference to the accompanying drawings.

Figure 1:
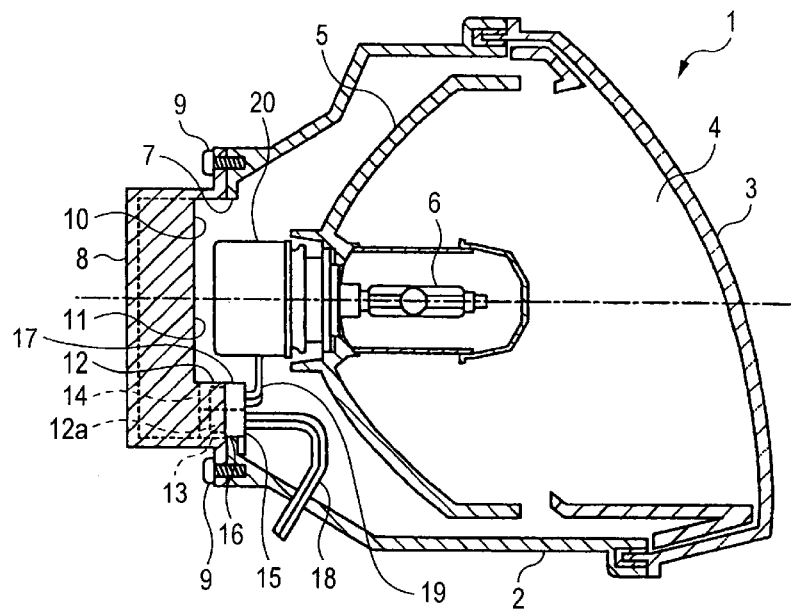
FIG. 1 shows a first embodiment of a vehicle headlamp of the present invention, and is a vertical cross-sectional view showing a condition in which an opening portion in a lamp cover is closed by a cover.
Figure 2:
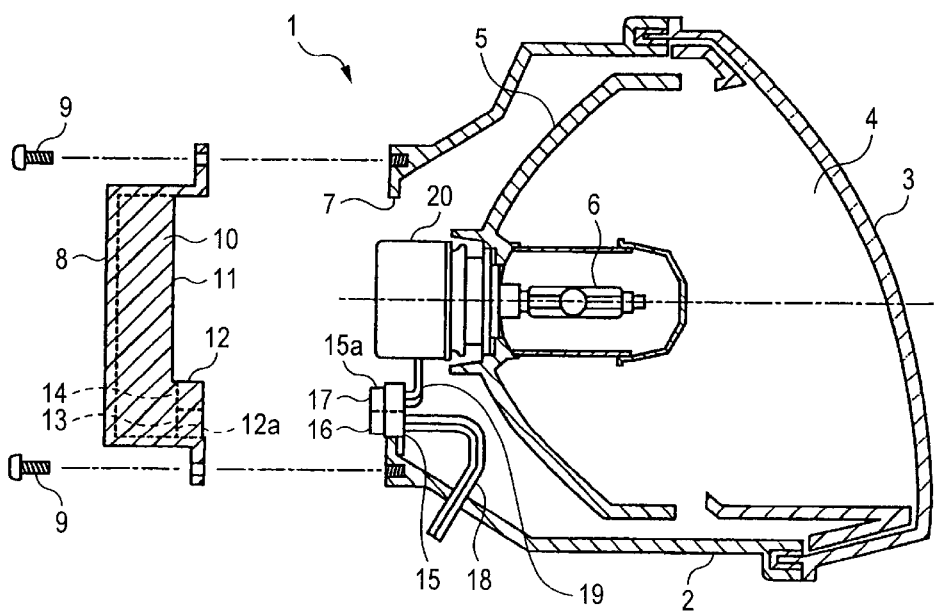
FIG. 2 is a vertical cross-sectional view of an important portion of the headlamp of FIG. 1, showing a condition in which the opening portion in the lamp body is open.
Figure 3:
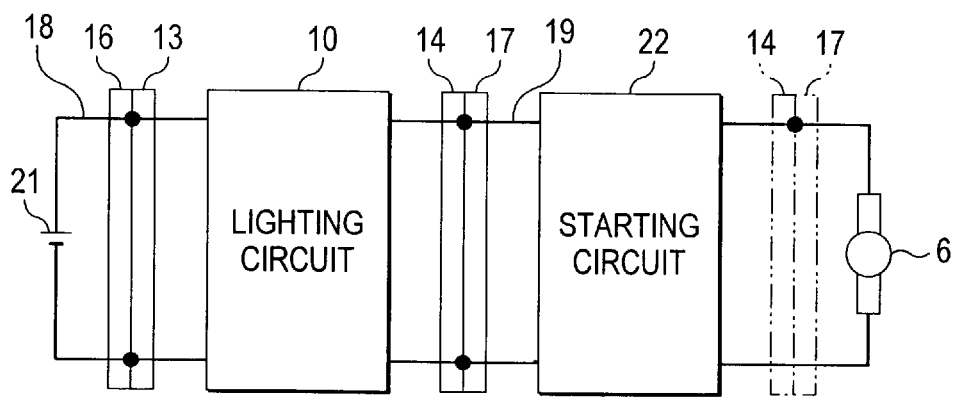
FIG. 3 is a block diagram of a lighting circuit of the headlamp of FIG. 1.

FIGS. 1 to 3 show the first embodiment of the vehicle headlamp of the invention.

The vehicle headlamp 1 includes a lamp body 2 having a recess open to a front side thereof. A front opening of the lamp body 2 is covered with a lens 3, so that a lamp chamber 4 is formed in the lamp body. A reflector 5 is tiltably supported within the lamp chamber 4. A discharge bulb 6 is removably attached to a central portion of a rear portion of the reflector 5.

An opening (opening portion) 7 is formed in a central portion of a rear portion of the lamp body 2 which is disposed in opposed relation to the discharge bulb 6. This opening 7 is covered with a detachable cover 8. The cover 8 is secured to the lamp body 2 by screws 9, 9.

A lighting circuit 10 for supplying electric power to the discharge bulb 6 to light the same is formed integrally on an inner surface of the cover 8. More specifically, a predetermined circuit, formed by necessary parts, is provided within a casing body 11. The casing body 11 is fixedly secured to the inner side of the cover 8.

A connector portion 12 is formed at a peripheral edge portion of the casing body 11 of the lighting circuit 10. The connector portion 12 comprises two connectors, that is, an input connector 13 and an output connector 14, which are formed integrally with each other, and are arranged in contiguous relation to each other. The connector portion 12 is a socket-type connector for receiving a plug-type connector, and has a recess 12a open to a front side thereof.

A connector portion 15 is fixedly secured to an edge portion of the opening 7 in the lamp body 2. The connector portion 15 comprises a power source-side connector 16 and a bulb-side connector 17 which are formed integrally with each other, and are arranged in contiguous relation to each other. This connector portion 15 is a plug-type connector portion, and has a projection 15a formed on and projecting rearwardly from a rear side thereof, and this projection 15a can be inserted into the recess 12a in the socket-type connector portion 12.

The power source-side connector 16 is connected to a battery via a wire harness 18 (input line) (A lighting switch may be provided between this connector 16 and the battery), and the bulb-side connector 17 is connected to a power supply socket 20 via a wire harness 19 (output line).

FIG. 3 is a block diagram showing an outline of a circuit construction of the vehicle headlamp 1.

Namely, a source voltage of the battery 21 is increased by the lighting circuit 10, and also is converted into a lighting voltage (which is a high AC voltage) by this lighting circuit 10 through DC-to-AC conversion. The lighting voltage is applied to the discharge bulb 6. There is provided a starting circuit 22 which applies a starting voltage to the discharge bulb 6 in superimposed relation to the lighting voltage at the time of activating the discharge bulb 6 (that is, starting the lighting of the discharge bulb).

The starting circuit 22 is provided within the power supply socket 20. The starting circuit 22 and the lighting circuit 10 are connected together by the output connector 14 and the bulb-side connector 17. The lighting circuit 10 and the battery 21 are connected together by the input connector 13 and the power source-side connector 16.

There are cases where the starting circuit 22 is not separate from the lighting circuit 10, and is not provided within the power supply socket 10, but is provided within the casing body 11, and is formed integrally with the lighting circuit 10. In such a case, the starting circuit 22 and the discharge bulb 6 are connected together by the output connector 14 and the bulb-side connector 17 (see dots-and-dash lines in FIG. 3). In the case where the starting circuit 22 is thus provided within the casing body 11, and is formed integrally with the lighting circuit 10, the lighting circuit 10, including the starting circuit 10, will be referred to as "lighting circuit" in the specification of the present application. Namely, the term "lighting circuit" means only the lighting circuit 10 of FIG. 3 when the starting circuit is provided within the power supply socket 20, while this term means a combination of the lighting circuit 10 and the starting circuit 22 of FIG. 3 when the starting circuit 22 is provided integrally within the casing body 11.

When the cover 8 is attached to the lamp body 2 to close the opening 7 (see FIG. 1), the projection 15a of the connector portion 15, provided at the lamp body 2, is fitted into the recess 12a in the connector portion 12 provided at the cover 8. As a result, the input connector 13 and the power source-side connector 16 are connected together, and also the output connector 14 and the bulb-side connector 17 are connected together, so that a lighting voltage can be supplied to the discharge bulb 6.

When the cover 8 is removed from the lamp body 2, the connector portion 12 on the cover 8 is automatically separated from the connector portion 15 on the lamp body 2, is so that the supply of electric power to the lighting circuit 10 is interrupted. Therefore, when an operation, such as an operation for exchanging the discharge bulb 6, is to be effected by opening the opening 7, the operation cannot be carried out through the opening 7 unless the cover 8 is removed (that is, unless the connectors 13 and 14 of the connector portion 12 are separated respectively from the connectors 17 and 18 of the connector portion 15) regardless of whether the lighting switch is provided (In such a case, there may be occasions when the operator forgets to turn off the lighting switch before the operation) or not. Therefore, the risk of inadvertently touching the high-voltage portion can be prevented.

The generation of a high voltage during the discharge bulb-exchanging operation or the like can be more positively prevented by disconnecting the output side of the lighting circuit. Therefore, by separating the connectors 14 and 17 from each other, the generation of such a high voltage can be positively prevented. A high voltage is applied to the connectors 14 and 17, and therefore in order to prevent a high voltage from being generated at the connectors when separating them from each other, the wire harness, which extends from the battery to the lighting circuit, and is supplied with a relatively low voltage (about 12V) offering no risk of generating a high voltage, is disconnected by separating the connectors 13 and 16 from each other, thereby stopping the operation of the lighting circuit. Therefore, when the cover 8 is opened, the supply of the electric power is interrupted at two points, that is, the input and output sides of the lighting circuit, and by doing so, the generation of the high voltage can be positively prevented.

The lighting circuit 10 is provided integrally within the cover 8, and the connector portion is provided in the vicinity of the opening 7. In this construction the wire harnesses do not need to be extended a long distance, and therefore the interference of the wire harnesses within the lamp can be prevented, and the cost of the wire harnesses can be minimized.

Figure 4:
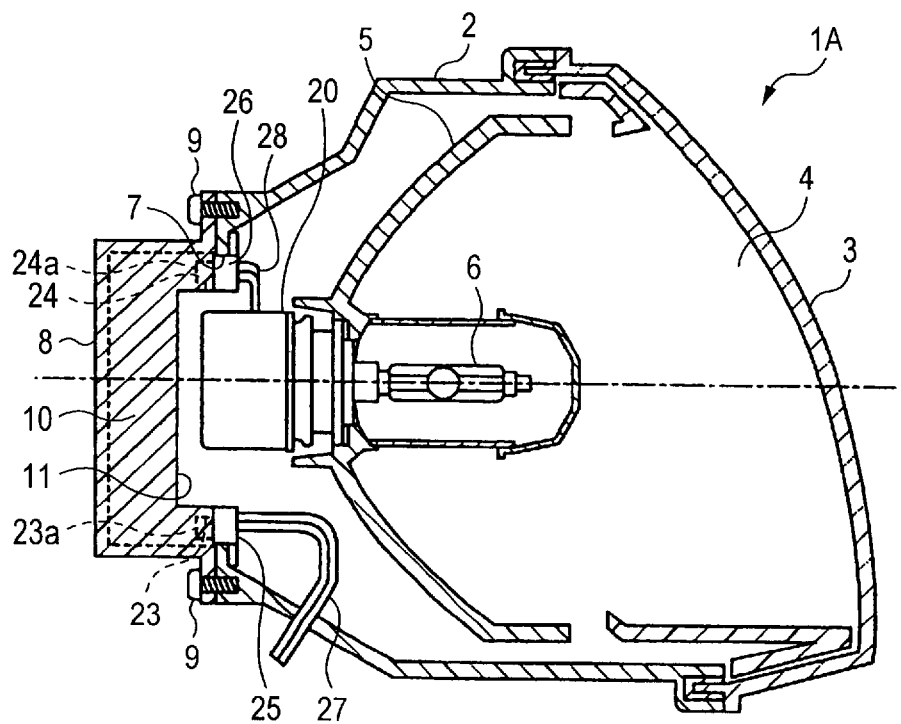
FIG. 4 shows a second embodiment of a vehicle headlamp of the invention, and this Figure is a vertical cross-sectional view showing a condition in which an opening portion in a lamp body is closed by a cover.
Figure 5:
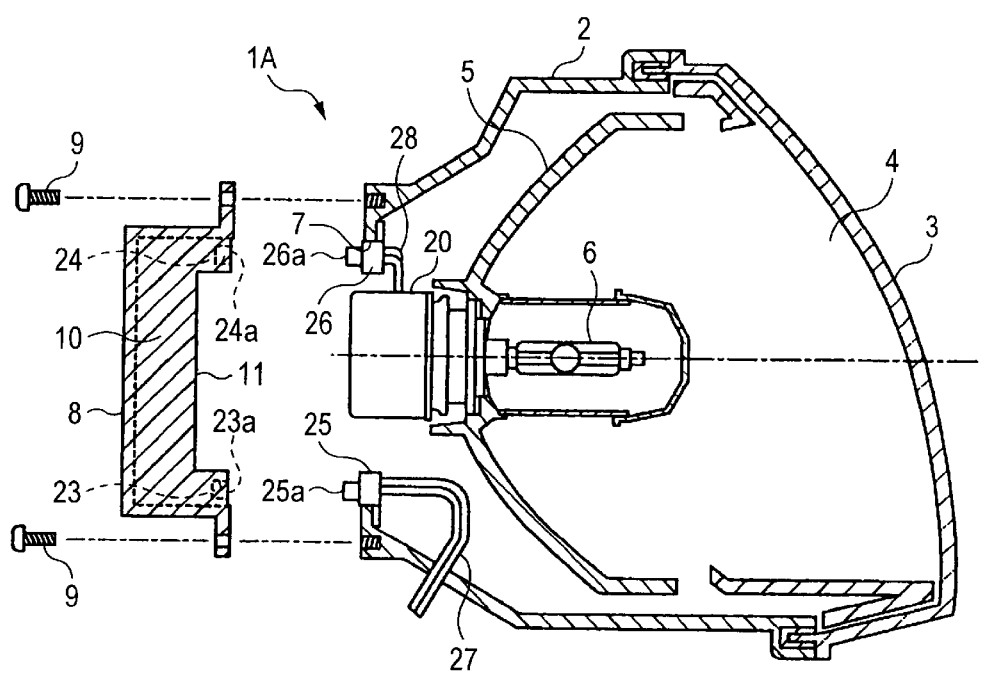
FIG. 5 is a vertical cross-sectional view of an important portion of the headlamp of FIG. 4, showing a condition in which the opening portion in the lamp body is open.

FIGS. 4 and 5 show a second embodiment of a vehicle headlamp of the present invention.

The vehicle headlamp 1A of this second embodiment differs from the vehicle headlamp 1 of the first embodiment in that an input connector and an output connector are provided separately from each other and that a power source-side connector and a bulb-side connector are provided separately from each other.

The input connector 23 and the output connector 24, which are socket-type connectors, respectively, are provided respectively at different portions of a casing body 11 of a lighting circuit 10 provided on an inside of a cover 8. The two connectors 23 and 24 have forwardly-open recesses 23a and 24a, respectively.

The power source-side connector 25 and the bulb-side connector 26, which are plug-type connectors, respectively, are fixedly secured respectively to those portions of an edge portion of an opening 7 (formed in a lamp body 2) disposed in opposed relation to the input connector 23 and the output connectors 24, respectively. These connectors 25 and 26 have projections 25a and 26a, respectively, formed on and projecting rearwardly from their rear sides.

The power source-side connector 25 is connected to a battery via a wire harness 27 (input line) (A lighting switch may be provided between this connector 25 and the battery). The bulb-side connector 26 is connected to a power supply socket 20 via a wire harness 28 (output line).

When the cover 8 is attached to the lamp body 2 to close the opening 7, the projection 25a of the power source-side connector portion 25 is fitted into the recess 23a in the input connector portion 23, while the projection 26a of the bulb-side connector 26 is fitted into the recess 24a of the output connector 24. As a result, the power source-side connector 25 and the input connector 23 are connected together, and the bulb-side connector 26 and the output connector 24 are connected together, so that a lighting voltage can be supplied to a discharge bulb 6.

When the cover 8 is removed from the lamp body 2 to open the opening 7, the power source-side connector 25 is separated from the input connector 23, and also the bulb-side connector 26 is separated from the output connector 24, so that the supply of the lighting voltage to the discharge bulb 6 is disengaged.

Therefore, in the vehicle headlamp 1A of the second embodiment, when an operation, such as an operation for exchanging the discharge bulb 6, is to be effected while opening the opening 7, this operation can not be carried out through the opening 7 unless the cover 8 is removed (that is, unless the connection between the power source-side connector 25 and the input connector 23, as well as the connection between the bulb-side connector 26 and the output connector 24, is interrupted) regardless of whether the lighting switch is provided (In this case, there are occasions when the operator forgets to turn off the lighting switch before the operation) or not. Therefore, the risk of inadvertently touching the high-voltage portion can be positively avoided.

The shapes and structures of the various portions of the above embodiments are shown merely by way of example for performing the present invention, and the technical scope of the present invention should not be construed as being limited by these.

As is clear from the foregoing description, the vehicle headlamp of the present invention includes the reflector supported on the lamp body, the discharge bulb mounted on the reflector, the lighting circuit for supplying electric power to the discharge bulb, the socket coupled to the discharge bulb to connect this discharge bulb to the lighting circuit, the opening portion formed in that portion of the lamp body disposed rearwardly of the discharge bulb, and the cover for covering said opening. The headlamp is characterized in that the power source-side connector, which is provided on the input line for inputting electric power from the power source into the lighting circuit, and the bulb-side connector, which is connected to one end of the output line which is connected at the other end thereof to the socket so as to output the electric power from the lighting circuit to the discharge bulb, are fixedly secured to that portion of the lamp body disposed in the vicinity of the opening portion. The lighting circuit, which is provided with the input connector for connection to the power source-side connector, and the output connector for connection to the bulb-side connector, is integrally formed on the cover. When the cover is moved to open the opening portion, the connection between the power source-side connector and the input connector and the connection between the bulb-side connector and the output connector are simultaneously interrupted.

Therefore, in the vehicle headlamp of the present invention, when the opening portion in the lamp body is opened so as to enable an operation, such as the discharge bulb-exchanging operation, the connection between the power source-side connector and the input connector and the connection between the bulb-side connector and the output connector are simultaneously interrupted without fail, so that the electric power will not be supplied to the lighting circuit. Therefore, when such an operation is carried out even in a condition in which the operator has forgotten to turn off the lighting switch, the operator will not touch any high voltage-applied portion such as the socket.

In an implementation, the power source-side connector and the bulb-side connector are formed integrally with each other. Therefore, the number of the component parts can be reduced, and the labor required for the mounting operation and for handling, such as storage and transportation, can be saved.

In an implementation, the power source-side connector and the bulb-side connector are fixedly secured to the lamp body in such a manner that the two connectors are spaced from each other. Therefore, the lighting circuit can have a versatile design, and the lighting circuit can be produced at a low cost.

What is claimed is:

1. A vehicle headlamp comprising a reflector supported on a lamp body; a discharge bulb mounted on said reflector; a lighting circuit for supplying electric power to said discharge bulb; a socket coupled to said discharge bulb to connect said discharge bulb to said lighting circuit; an opening portion formed in a portion of said lamp body disposed rearwardly of said discharge bulb; and a cover for covering said opening portion; wherein:

a power source-side connector, which is provided on an input line for inputting electric power from a power source into said lighting circuit, and a bulb-side connector, which is connected to one end of an output line which is connected at the other end thereof to said socket so as to output the electric power from said lighting circuit to said discharge bulb, are fixedly secured to a portion of said lamp body disposed in the vicinity of said opening portion;

said lighting circuit, which is provided with an input connector for connection to said power source-side connector, and an output connector for connection to said bulb-side connector, is integrally formed on said cover; and when said cover is moved to open said opening portion, the connection between said power source-side connector and said input connector and the connection between said bulb-side connector and said output connector are simultaneously interrupted.

2. The vehicle headlamp according to claim 1, wherein said power source-side connector and said bulb-side connector are formed integrally with each other.

3. The vehicle headlamp according to claim 1, wherein said power source-side connector and said bulb-side connector are fixedly secured to said lamp body in such a manner that said two connectors are spaced from each other.

4. Power safety circuitry for a vehicle headlamp comprising:
   a lighting circuit having an input connector and an output connector;
   a power source connector for connection to the input connector, the power source connector affixed to a lamp body portion near an opening portion; and
   a bulb connector for connection to the output connector;
   wherein when a cover of the headlamp is opened, the connection between the power source connector and the input connector and the connection between the bulb connector and the output connector are simultaneously interrupted.

5. The power safety circuitry of claim 4 wherein the power source connector and the bulb connector are formed as an integrated unit.

6. The power safety circuitry of claim 4 wherein the power source connector is spaced apart from the bulb connector.

* * * * *